Patented Oct. 28, 1941

2,260,749

UNITED STATES PATENT OFFICE 2,260,749

MINERAL COMPOSITION

Victor V. Kelsey, Washington, D. C., assignor to Dominion Minerals, Incorporated, Washington, D. C., a corporation of Virginia No Drawing. Application March 1, 1939, Serial No. 259,105

12 Claims. (Cl. 106—52)

This invention relates to improvements in the processing of zoisitic rock. It includes new operations in the grinding of such rock, improved products from such rock and the use of such improved products in the manufacture of glass.

The term "zoisitic" rock as used in this specification and the appended claims designates rock containing a substantial proportion of zoisite, together with substantial proportions of sodium and potassium aluminum silicates, such as albite and sericite.

The present invention has important advantages for use in the processing of a naturally occurring zoisitic rock found near Piney River, Virginia, and the new products produced from such rock have important advantages. This rock is frequently referred to as "aplite." This rock is composed chiefly of zoisite, albite, sericite and microcline with accessory minerals of titanite, garnet, apatite, clino-zoisite and quartz. A typical chemical analysis of the rock is approximately:

| | Per cent |
|---|---|
| $SiO_2$ | 58.72 |
| $Al_2O_3$ | 24.70 |
| $CaO$ | 6.90 |
| $Na_2O$ | 5.58 |
| $K_2O$ | 2.70 |
| $TiO_2$ | 0.12 |
| $Fe_2O_3$ | 0.30 |

The mineral content of several thin typical sections of this rock as determined by traversing selected areas under the microscope is approximately:

| | Per cent |
|---|---|
| Albite | 60–70 |
| Microcline | 5 |
| Sericite | 10–20 |
| Zoisite | 15–20 |
| Quartz and minor minerals | 5 or less |

While this analysis is largely an approximation it indicates in a general way the relative distribution of minerals in the rock. A recast of the chemical analysis indicates a substantially similar distribution of minerals. Based on the chemical analysis of the rock the percentage composition would be very closely:

| | Per cent |
|---|---|
| Zoisite, $4CaO.3Al_2O_3.6SiO_2.H_2O$ | 22.0 |
| Albite, $Na_2O.Al_2O_3.6SiO_2$ | 55.0 |
| Sericite, $K_2O.3Al_2O_3.6SiO_2.2H_2O$ | 13.0 |
| Microcline, $K_2O.Al_2O_3.6SiO_2$ | 5.0 |
| Quartz, $SiO_2$ | 3.0 |
| Titanite, $CaO.TiO_2.SiO_2$ | |
| Garnet, $3CaO.Al_2O_3.3SiO_2$ | 2.0 |
| Clino-zoisite, $4CaO.3Al_2O_3.6SiO_2.H_2O$ | |
| Apatite, $(CaF)Ca_4(PO_4)_3$ | |

Since the rock occurs naturally in Virginia, I have chosen to designate it as Virginia zoisitic rock, and it will be referred to in this specification and the appended claims by this name. Other zoisitic rocks containing substantial quantities of zoisite, along with such alkali aluminum silicates as albite, sericite and microcline may be similarly used in the practice of this invention.

For use in glass manufacture, the zoisitic rock, after mining, is crushed in jaw and gyratory crushers to a minus 20 mesh plus 100 mesh size; that is, to a size such that substantially all passes a 20 mesh screen and is retained on a 100 mesh screen. This is accomplished by passing the rock through suitable crushers, screening out the material coarser than 20 mesh and separating the fines, that is, the product which will pass a 100 mesh screen, from the product so obtained, advantageously by air separation. The separated coarse material is returned to the crushers, and the minus 20 mesh plus 100 mesh material is used for the production of glass or other products. The fine material, that is, material which passes a 100 mesh screen has heretofore been practically a waste product, as it is not suitable for use in glass manufacture or the like. Because of its fineness, it has presented a substantial industrial hazard, as do nearly all finely ground or powdered siliceous materials. The amount of the very finely divided material ordinarily obtained in the crushing and grinding of zoisitic rock to produce the 20 to 100 mesh product is about 40% of the total material passed through the crushing and grinding apparatus. This represents a very substantial expense if the material is discarded or sold at an extremely low price because of its finely divided condition.

The present invention provides for the conversion of this very finely divided material to a product graded in size from 20 to 100 mesh and which not only has the proper particle size for use in the glass and ceramic industry, but has important advantages over the zoisitic rock products obtained by the simple comminution of the rock as mined.

In accordance with the present invention, the finely divided material, for example, having a particle size such that substantially all passes a 100 mesh screen, separated from the 20 to 100 mesh screen material by air separation or other suitable separation, is subjected in a suitable furnace or kiln to a sintering, fritting or fusing operation in which the fine particles coalesce to form clinkers or nodules which are subsequently suitably broken up or ground to form a 20 to 100 mesh product. Such material as is more finely divided in this crushing or grinding operation may be returned for reprocessing, so that substantially all of the initial fine material obtained in the air or other separator is finally obtained as a product having the desired particle size for use in the glass or related industries. The coalesced particles so obtained have important advantages for use in the manufacture of glass, for example, because all of the volatile constituents are driven off during the sintering, fritting or fusing operation, the final product thus being relatively free from volatile constituents and producing few, if any, bubbles in glass which require removal during the fining of the glass. Furthermore, the coalesced product is amorphous or vitreous, and is not crystalline in structure as is the initial zoisitic rock. Thus this coalesced product promotes the fusion of the other materials, such as the glass sand, etc., in the manufacture of the glass, in much the same way as does the commonly used glass cullet (broken glass); and as the new product melts more easily and produces a more homogeneous glass than feldspar, it permits glass to be melted at lower temperatures.

In treating the fines from the grinding or crushing of the zoisitic rock, the material separated in the air separator is introduced into a kiln or furnace, advantageously a rotary kiln or furnace, either as the dry powder, or as a slurry with water. In the kiln or furnace, the material is heated to about cone 6 to cone 8. In this way, the very finely divided particles are agglomerated or coalesced to form nodules or clinkers. This agglomeration or coalescence may be a sintering or fritting or substantial fusion, depending upon the temperature to which the material is heated. The coalesced material from the furnace is then subjected to a suitable comminution, which may involve simple grinding in gyratory crushers, or may be accomplished by quenching the hot material in water to break it up into more or less finely divided particles, with subsequent grinding or crushing in suitable equipment, such as a gyratory crusher, to the proper size, or may be accomplished by subjecting the partially or completely vitrefied mass to the action of a blast of steam or air under pressure while at the high temperature used in coalescence. The comminuted material is then screened, to separate the properly sized particles, that is, the minus 20 mesh plus 100 mesh particles, the oversize particles being sent back for further grinding or crushing, and the more finely divided particles being again subjected to the same treatment to cause them to agglomerate or coalesce. The crushing, screening, etc., of the aggregates from the furnace or kiln may be accomplished in admixture with the zoisitic rock from the mine or quarry, but it is advantageous to keep the sintered, fritted or fused product separate from the mined products, because of its amorphous or vitreous condition and because of its advantages for use in the arts.

It is advantageous to treat the fines with a suitable reagent prior to or after introduction into the furnace to convert the iron present in the material to a volatile iron compound or compounds which will be removed during the heating operation. This is advantageous because in many glass manufacturing operations the amount of iron present in the raw materials is strictly limited, because of color considerations, etc. By the treatment of the fines with hydrogen chloride, chlorine, sulfur chloride or chlorine and sulfur chloride, magnesium chloride, etc., or other materials which combine with iron to yield a volatile iron compound, substantially all of the iron present in the zoisitic rock is readily removed during the agglomeration treatment, so that a product substantially free from iron is obtained. Such a product, of course, has important advantages for use in the manufacture of glass or the like, because it can be used to supply the alumina which is an important constituent in glass without at the same time introducing iron. During the process, the zoisitic rock may be colored by the addition of suitable metal oxides, with the production of a colored granular agglomerated product adapted for special manufacturing purposes, such as in the production of colored glass or other ceramic products, for decorative and protective coatings, etc., the colors being fused into the product at the elevated temperatures used. This affords a convenient and valuable method of introducing such metal oxides into the glass batch or the like.

In many cases it is advantageous to incorporate other mineral or rock products with the zoisitic rock to produce improved products of controllable constitution. For example, such mineral products as clay, spomudene, kaolin, china clay, pyrophyllite, cyanite, bauxite, amblygonite and other aluminum bearing mineral or rock products may be incorporated with the zoisitic rock before or during the agglomeration treatment to produce amorphous granular products having important advantages for use in the production of glass, etc. At the high temperatures of the agglomeration treatment, the zoisitic rock dissolves substantial amounts of the aluminum bearing minerals, and products are produced which are amorphous, free from volatile substances and combined water, and of a nature such that they readily melt or dissolve with other glass making ingredients at the temperature of the glass furnace. Many minerals, such as kaolin and china clay are high in alumina, and may contain from 40 to 45% or more of alumina, $Al_2O_3$, and thus are a good source of alumina for glass or the like. However, these minerals tend to coalesce into balls or lumps when stored, particularly if they are exposed to damp air and are permitted to absorb or adsorb water. Such lumps or balls do not always melt in the glass furnace and frequently cause the so-called "stones" in the finished glass, causing a loss. When such minerals are admixed with zoisitic rock, and the resulting product is subjected to the agglomeration treatment, an amorphous product, of predetermined composition, free from volatile materials and water, and free from the tendency to form lumps or balls which do not melt properly in the glass furnace, is obtained. These added minerals may be used to increase the alumina content of the zoisitic rock, to modify the proportions of alkali and alkaline earth metals, etc., for example, to produce composite products containing predetermined proportions of silicates of aluminum, potassium, sodium, lithium and calcium. Such products have important advantages in glass making because of uniformity of composition, because they do not tend to form "stones," "seeds," etc. in the finished glass, and because they melt easily in and mix easily with other glass ingredients to form homogeneous glass. In this way, the zoisitic rock agglomerates may be given an increased calcium content by the addition of limestone, an increased lithium content by the addition of spodumene, amblygonite, or other lithium bearing mineral or rock, an increased alumina content by the addition of clay, kaolin, china clay, pyrophyllite, bauxite, cyanite, etc. The zoisitic rock fines, when admixed with one or more of these minerals and then sintered, fritted or fused, comminuted and graded, gives a homogeneous, amorphous, easily melted, volatile-free granular product, the desirable properties of which are largely due to the fluxing properties of the zoisitic rock fines. Such addition of other minerals, if they are relatively free from iron, will also reduce the percentage iron content in the final product to an extent such that it is unobjectionable. The granular product obtained in this way, by agglomeration of the zoisitic rock fines with the addition of clay, etc., with or without added coloring materials, such as metal oxides, besides having advantages for use in glass making and the like, are adapted, when properly graded in size, for use as roofing granules, etc.

The new product of the present invention is advantageous for use in the manufacture of glass, ceramic products, etc., because of its freedom from volatile constituents and because, having an amorphous or vitrified structure, it promotes the fusion of the other raw materials of the glass mix in much the same way as does glass cullet, thus serving as an advantageous means of introducing the desirable alumina in the glass mix. The use of alumina bearing constituents in glass mixtures is well known, the alumina having several important functions including improvement in the viscosity characteristics of the glass which permit the glass to be molded more readily and to be set more quickly in the molds, the fixing of the other constituents to prevent dissociation, for example, of the soda from the silica which might detract from the brilliance of the glass, the prevention of devitrification, that is, the change of the glass from an amorphous, vitreous state to a crystalline state. The following are typical glass formulae in which the product of the present invention is used as a constituent in a glass mix.

| | | | |
|---|---|---|---|
| Sand | 1000 | 1000 | 1000 |
| Soda ash | 371 | 250 | 380 |
| Zoisitic rock | 45 | 170 | 70 |
| Burnt dolomite | 100 | --- | 100 |
| Limestone | --- | 350 | --- |
| Borax | 30 | --- | 50 |
| Salt cake | 4 | 75 | 5 |
| Cullet | --- | --- | 400 |

Glass bottle formulae:

| | | | |
|---|---|---|---|
| Sand | 1000 | 1000 | 1000 |
| Soda ash | 365 | 320 | 300 |
| Limestone | 210 | 230 | --- |
| Burnt lime | --- | --- | 135 |
| Zoisitic rock | 75 | 100 | 150 |
| Borax | --- | 60 | 10 |
| Salt cake | 5 | --- | 5 |
| Niter | --- | 2½ | 2½ |
| Arsenic | 2 | 1 | 2 |

Machine drawn window glass formulae:

| | | |
|---|---|---|
| Sand | 1000 | 1000 |
| Soda ash | 300 | 285 |
| Dolomitic limestone | 220 | 200 |
| Aplite | 75 | 100 |
| Salt cake | 70 | 75 |
| Carbon | 5 | 5 |
| Arsenic | 2 | 3 |

The amount of the alumina bearing product of the invention used in glass or other products may be varied over a relatively wide range, depending to a large extent upon the quantity of alumina desired in the final product, and on the properties of the final product desired. In any event, the new product of this invention has important advantages for such use over the previously known zoisitic rock products, particularly where the iron present in the zoisitic rock has been removed during the processing of the fines to convert them to a product of properly graded size and amorphous condition.

I claim:

1. The process of forming a non-glass-like product from fines of zoisitic rock resulting from the crushing of zoisitic rock to form particles of a size which will be retained on a 100 mesh screen, and which are of a size such that the major portion passes a 100 mesh screen, which comprises forming such fines into a non-glass-like product by subjecting them to a temperature sufficient to sinter or coalesce them but insufficient to completely fuse them, and comminuting the resulting coalesced product to form particles, a substantial portion of which are of a size which will be retained on a 100 mesh screen.

2. The process of treating zoisitic rock which comprises crushing the rock to form particles of plus 100 mesh size and fines of minus 100 mesh size, separating said particles from the fines, forming the fines into a non-glass-like product by subjecting them to a temperature sufficient to sinter or coalesce them but insufficient to completely fuse them, crushing the resulting coalesced product to form additional particles, a substantial portion of which are of plus 100 mesh size and fines of minus 100 mesh size, and separating the particles thus formed from the fines.

3. The process of forming a non-glass-like product which comprises mixing fines of zoisitic rock, resulting from the crushing of zoisitic rock to form particles of a size which will be retained on a 100 mesh screen, and which are of a size such that the major portion passes a 100 mesh screen, with a mineral of the class consisting of aluminum, alkaline earth metal and alkali metal bearing minerals, subjecting the resulting mixture to a temperature sufficient to sinter or coalesce the mixture but insufficient to completely fuse it, and comminuting the resulting coalesced product to form particles, a substantial portion of which are of a size which will be retained on a 100 mesh screen.

4. The process of forming a non-glass-like product as set forth in claim 3, in which the fines of the zoisitic rock are treated with an agent which converts the iron present to iron compounds which are volatile at a temperature below the temperature to which the mixture is subjected to sinter or coalesce it.

5. The process of forming a non-glass-like product as set forth in claim 3, in which the fines of the zoisitic rock are treated with an agent which converts the iron present to iron chloride, before the mixture including the fines of the zoisitic rock is subjected to a temperature sufficient to sinter or coalesce the mixture.

6. The process of forming a non-glass-like product from fines of Virginia zoisitic rock to form particles of a size which will be retained on a 100 mesh screen and which are of a size such that the major portion passes a 100 mesh screen, which comprises forming such fines into a non-glass-like product by subjecting them to a temperature sufficient to sinter or coalesce them but insufficient to completely fuse them, and comminuting the resultant coalesced product by quenching it in water to break it up into granules or particles, a substantial portion of which are of a size which will be retained on a 100 mesh screen.

7. A new product in the form of non-glass-like particles or granules, said product being substantially free from volatile constituents and formed by subjecting comminuted zoisitic rock of a size which will pass a 100 mesh screen to a temperature sufficient to sinter or coalesce the particles thereof but insufficient to completely fuse them.

8. A new product in the form of non-glass-like particles or granules, said product being substantially free from volatile constituents and formed by subjecting a mixture of comminuted zoisitic rock of a size which will pass a 100 mesh screen and at least one mineral of the class consisting of aluminum, alkaline earth metal and alkali metal bearing minerals to a temperature sufficient to sinter or coalesce it but insufficient to completely fuse it.

9. A new product in the form of non-glass-like particles or granules, said product being substantially free from volatile constituents, of a size substantially minus 20 mesh plus 100 mesh, and formed by subjecting comminuted Virginia zoisitic rock of a size which will pass a 100 mesh screen to a temperature sufficient to sinter or coalesce the particles thereof but insufficient to completely fuse them, and then comminuting the resultant coalesced product to form said particles of minus 20 mesh plus 100 mesh size.

10. In the manufacture of glass, the step of introducing as one constituent a non-glass-like alumina bearing material which is substantially free from volatile constituents and formed by subjecting comminuted zoisitic rock of a size which will pass a 100 mesh screen to a temperature sufficient to sinter or coalesce the particles thereof but insufficient to completely fuse them, and then comminuting the resultant coalesced product to form the non-glass-like alumina bearing material.

11. In the manufacture of glass, the step of introducing as one constituent a non-glass-like alumina bearing material which is substantially free from volatile constituents, of a size substantially minus 20 mesh plus 100 mesh, and formed by subjecting comminuted Virginia zoisitic rock of a size which will pass a 100 mesh screen to a temperature sufficient to sinter or coalesce the particles thereof but insufficient to completely fuse them, and then comminuting the coalesced product to form said alumina bearing particles of minus 20 mesh plus 100 mesh size.

12. In the manufacture of glass, the step of introducing as one constituent a non-glass-like product which is substantially free from volatile constituents and is formed by subjecting a mixture of comminuted zoisitic rock of a size which will pass a 100 mesh screen and at least one mineral of the class consisting of aluminum, alkaline earth metal and alkali metal bearing minerals, to a temperature sufficient to sinter or coalesce the particles thereof but insufficient to completely fuse them, and then comminuting the resulting coalesced product to form said alumina bearing material.

VICTOR V. KELSEY.